United States Patent
Akiyama et al.

(10) Patent No.: US 7,834,933 B2
(45) Date of Patent: Nov. 16, 2010

(54) VERTICAL SYNC SIGNAL GENERATOR (75) Inventors: Takaaki Akiyama, Tokyo (JP); Toyoaki Yamamoto, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 1066 days.

(21) Appl. No.: 11/581,114

(22) Filed: Oct. 16, 2006

(65) Prior Publication Data
US 2007/0132884 A1   Jun. 14, 2007

(30) Foreign Application Priority Data
Dec. 9, 2005  (JP) ............................. 2005-355800

(51) Int. Cl.
H04N 5/10  (2006.01)
(52) U.S. Cl. ..................................... 348/521
(58) Field of Classification Search .................. 348/521
See application file for complete search history.

(56) References Cited
U.S. PATENT DOCUMENTS

| | | | | |
|---|---|---|---|---|
| 4,166,250 A | * | 8/1979 | Meki et al. .................. 327/160 |
| 4,238,770 A | * | 12/1980 | Kobayashi et al. .......... 348/529 |
| 4,722,004 A | * | 1/1988 | Miyamoto et al. .......... 348/180 |
| 4,792,852 A | * | 12/1988 | Narusawa .................... 348/530 |
| 5,031,041 A | * | 7/1991 | Fling .......................... 348/529 |
| 5,162,910 A | * | 11/1992 | Willis ......................... 348/521 |
| 5,189,515 A | * | 2/1993 | Chen .......................... 348/535 |
| 5,291,287 A | * | 3/1994 | Murayama et al. .......... 348/536 |
| 5,469,220 A | * | 11/1995 | Kumada ...................... 348/529 |
| 5,576,770 A | * | 11/1996 | Rumreich .................... 348/525 |
| 7,046,301 B2 | * | 5/2006 | Akiyama ...................... 348/529 |

FOREIGN PATENT DOCUMENTS

JP   10117296   5/1998

* cited by examiner

*Primary Examiner*—Paulos M Natnael
(74) *Attorney, Agent, or Firm*—Volentine & Whitt, PLLC

(57) ABSTRACT

When a vertical sync pulse detection circuit mistakenly detects a vertical sync pulse in an inputted video signal, a sync stability detection circuit detects whether a detection signal of the vertical sync pulse detection circuit and a timing signal generated from a count value of a first frame cycle counter are in accordance, and the accordance confirmation detection result becomes one of discordance. When this occurs, the count value of the first frame cycle counter is not loaded to a second frame cycle counter so, due to the operation of the second frame cycle counter, a timing generating decoder circuit and a vertical sync signal generating circuit, a vertical sync signal at the previously detected normal phase can be generated.

4 Claims, 10 Drawing Sheets

THE VERTICAL SYNC SIGNAL GENERATOR OF EMBODIMENT 1 OF THE PRESENT INVENTION

FIG. 4

OPERATION TIME CHART OF FIG. 3

FIG. 7 OPERATION TIME CHART OF FIG. 5

CONVENTIONAL VERTICAL SYNC SIGNAL GENERATOR

FIG. 10
RELATED ART

OPERATION TIME CHART OF FIG. 9

VERTICAL SYNC SIGNAL GENERATOR

CROSS-REFERENCE TO RELATED APPLICATION

This application claims priority under 35 USC 119 from Japanese Patent Application No. 2005-355800, the disclosure of which is incorporated by reference herein.

BACKGROUND OF THE INVENTION

1. Field of the Invention

The present invention relates to a vertical sync signal generator in a device such as a digital video decoder that decodes video signals. This vertical sync signal generator can generate vertical sync signals with no delay even if, for example, the inputted video signals temporarily enter the state of a weakened electric field.

2. Description of the Related Art

Figure 8:
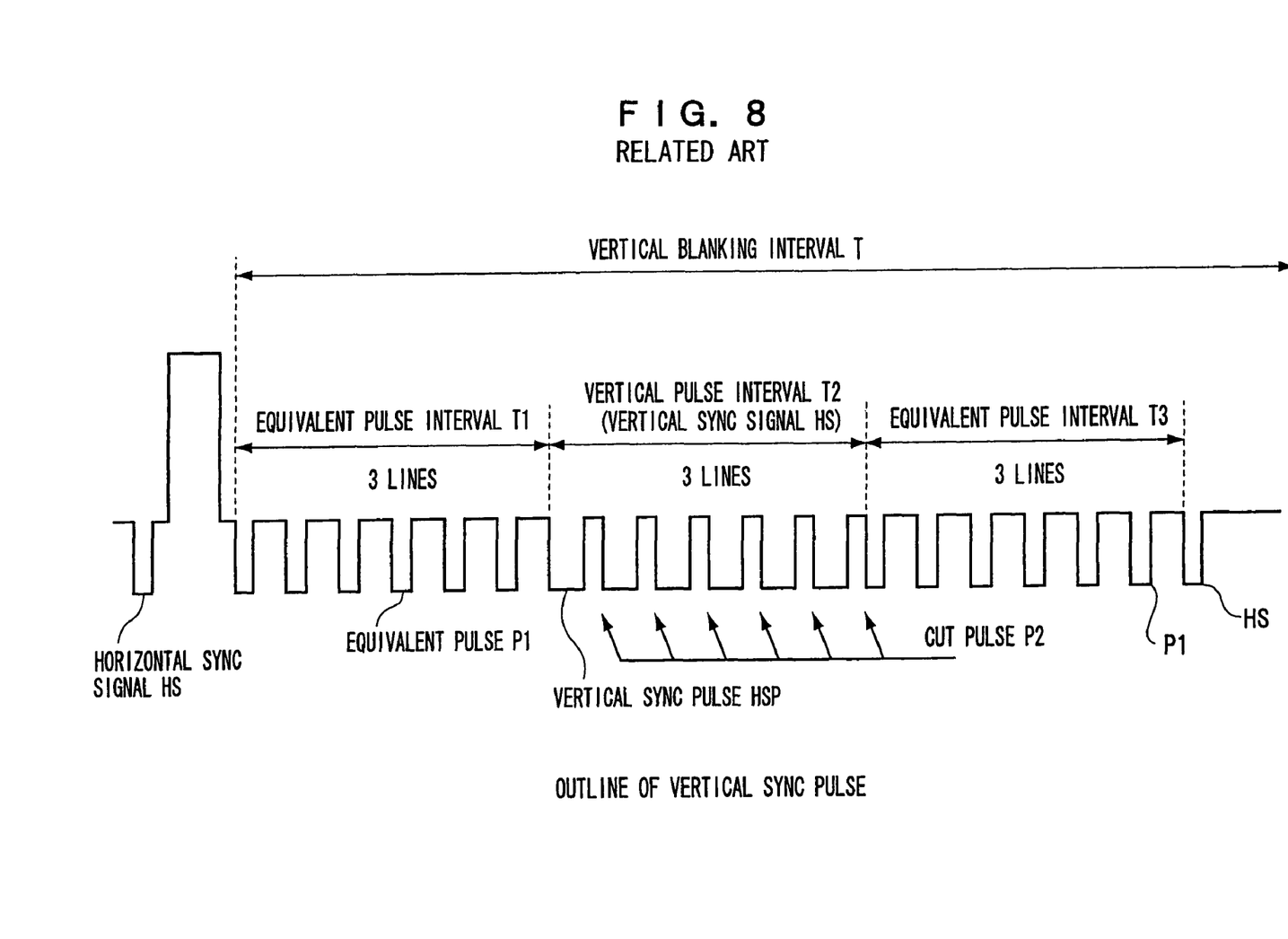
FIG. 8 is a general waveform diagram of a vertical sync pulse.

FIG. 8 is a general waveform diagram showing a vertical sync pulse in a vertical blanking interval in a regular television signal (hereafter "TV signal").

Synthesized video signals are generally referred to as TV signals, and these include video signals for reproducing images and sync signals for assembling images. For synchronization signals, there are horizontal sync signals VS and vertical sync signals HS, and these are respectively placed in TV signal waveforms inside the horizontal blanking intervals and the vertical blanking intervals.

In the vertical blanking interval T shown in FIG. 8, there is a vertical sync pulse interval T2 of three lines made from vertical sync signals HS. The signals of this portion have cuts that are made in positive pulses P2 (cut pulses) with narrow widths repeated at a frequency of two times that of the horizontal sync frequency. An equivalent pulse interval T1 of three lines and an equivalent pulse interval T3 of three lines are provided directly before and after the vertical sync pulse interval T2. At each equivalent pulse interval T1, T3, six narrow and thin equivalent pulses P1 continue at the same frequency as the cut pulses P2. The equivalent pulses P1 and the cut pulses P2 inside the vertical blanking interval T fulfill the role of stably maintaining the horizontal sync on the receiver side.

A horizontal sync signal HS is generated by detecting a vertical sync pulse HSP. An example of the configuration of a conventional vertical sync signal generator is shown in FIG. 9.

Figure 9:
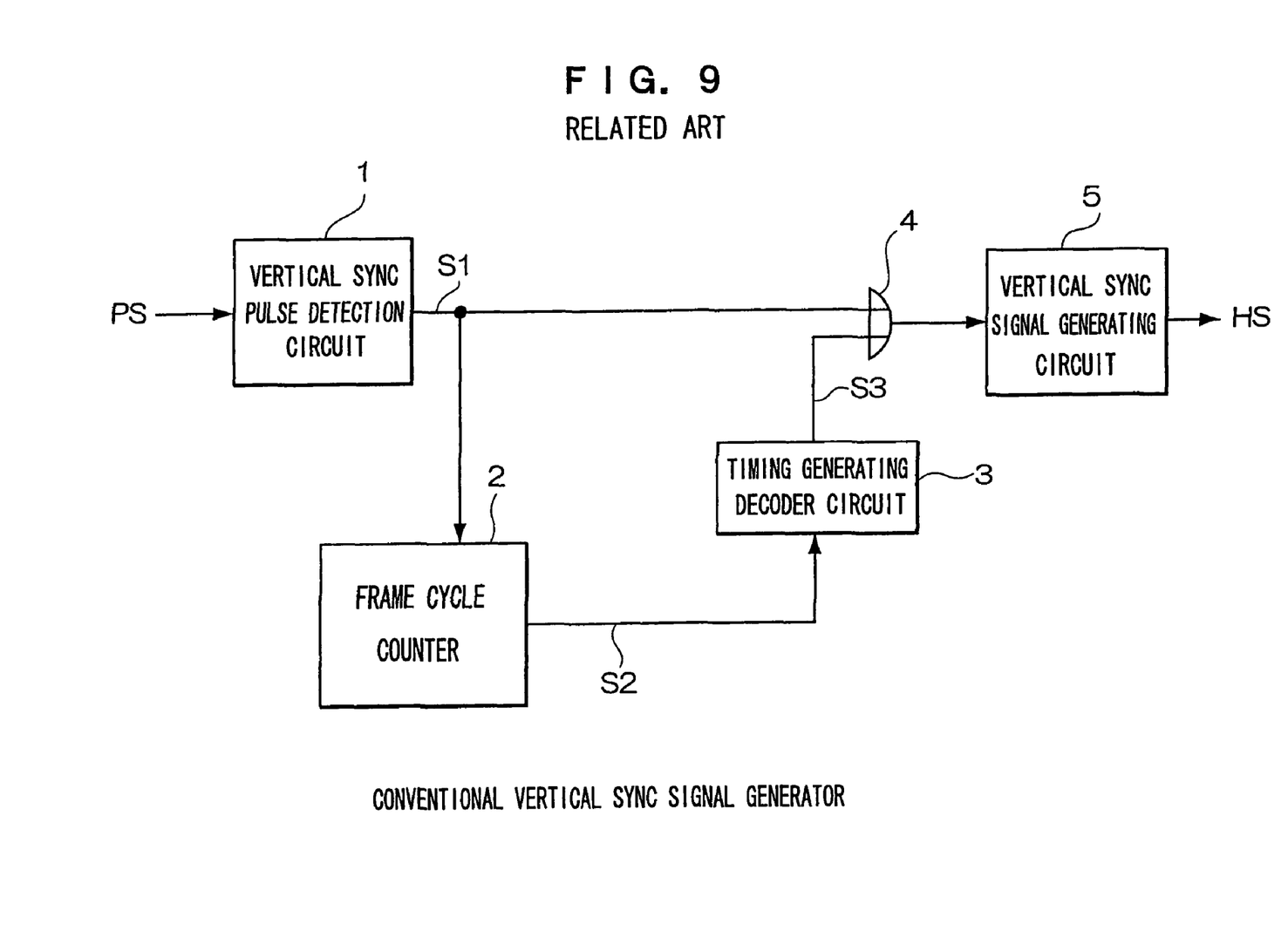
FIG. 9 is a general structural block diagram of a conventional vertical sync signal generator.
Figure 10:
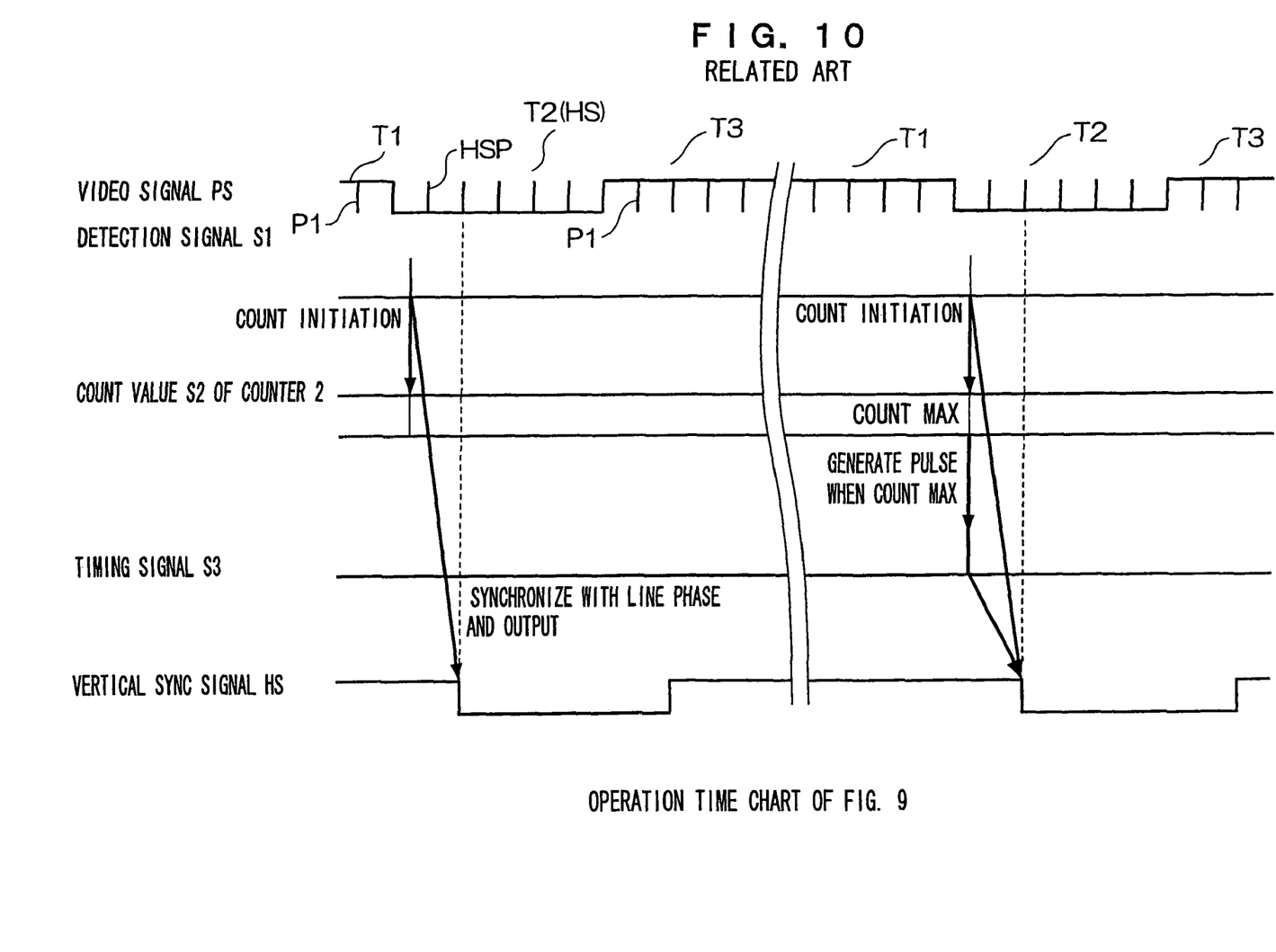
FIG. 10 is a time chart showing the operation of FIG. 9.

FIG. 9 is a general structural block diagram showing an example of the configuration of a conventional vertical sync signal generator, and FIG. 10 is a time chart showing the operation of the vertical sync signal generator of FIG. 9.

With this vertical sync signal generator, a method is used where a vertical sync signal HS is generated with a vertical sync signal generating circuit 5 via a logical sum gate 4 (hereafter, "OR gate") with a detection signal S1, only when a vertical sync pulse HSP from an inputted video signal PS has been detected with the vertical sync pulse detection circuit 1. Or, a method is used where, when the vertical sync pulse detection circuit 1 has detected a vertical sync pulse HSP from the inputted video signal PS, counting is performed with an upright frame cycle counter 2 where the maximum count value (MAX) is 262-263 while generating a vertical sync signal HS from the detection signal S1 with the vertical sync signal generating circuit 5 via the OR gate 4. This count value S2 is decoded with a timing generating decoder circuit 3, and a timing signal S3 of the position where the next vertical sync pulse HSP should come is sought; A vertical sync signal HS is generated at this position as well with the vertical sync signal generating circuit 5 via the OR gate 4, and this signal is synchronized with the line phase and outputted.

Conventional patent publications relating to this type of vertical sync signal generator include, for example, the Official Gazette of JP-A (Laid-open) No. 10-117296.

Nonetheless, there are certain problems with conventional vertical sync signal generators. When the vertical sync pulse detection circuit 1 makes a mistake and detects a vertical sync pulse HSP due to the noise included in the video signal PS when there is a weak electric field, this detection signal S1 is imparted to the vertical sync signal generating circuit 5 via the OR gate 4. Accordingly, there has been a problem in that erroneous vertical sync signals HS are generated by this the vertical sync signal generating circuit 5. And noise at the time of a weak electric field is generated more easily with TV signals than when compared to video signals.

SUMMARY OF THE INVENTION

The present invention has been made in view of the above circumstances and provides a vertical sync signal generator comprising: a vertical sync pulse detection circuit that detects a vertical sync pulse from an inputted video signal and outputs a detection signal; a first count circuit that counts a frame cycle of the vertical sync pulse from the detection signal and outputs a first count result; a first timing generating decoder circuit that decodes the first count result and generates a first timing signal for when the vertical sync pulse should be detected next; an accordance/discordance detection circuit that detects whether the detection signal and the first timing signal are in accordance and outputs a detection result of accordance/discordance; a second count circuit that, when the detection result is of accordance, loads the first count value and counts a frame cycle of the vertical sync pulse from the first count value with the loaded first count value acting as the initial value and outputs a second count value, and when the detection result is one of discordance, does not load the first count value and outputs the previously counted count value as the second count value; a second timing generating decoder circuit that decodes the second count result and generates a second timing signal for generation of a vertical sync signal; and a vertical sync signal generating circuit that uses the second timing signal and generates a vertical sync signal.

BRIEF DESCRIPTION OF THE DRAWINGS

Preferred embodiments of the present invention will be described in detail based on the following figures, wherein.

DETAILED DESCRIPTION OF THE INVENTION

The vertical sync signal generator comprises: a vertical sync pulse detection circuit that detects a vertical sync pulse from an inputted image signal and outputs a detection signal; a first frame cycle counter that counts the pulse frame cycles of the vertical sync pulse from the detection signal; a first timing generating decoder circuit that decodes the first count result and generates a first timing signal for when the vertical sync pulse should next be detected; a sync stability detection circuit that detects whether the detection signal and the first timing signal are in accordance and then outputs a result on the detection of accordance confirmation; a second frame cycle counter that outputs a second count result; a second timing generating decoder circuit that decodes the second count result and generates a second timing signal for vertical sync signal generation; and a vertical sync signal generating circuit that uses the second timing signal and generates a vertical sync signal.

When the accordance confirmation detection result indicates accordance, the second frame cycle counter loads the first count value and sets this loaded first count value as the beginning value, counts the frame cycles of the vertical sync pulse from the first count value, and outputs the second count value. When the accordance confirmation detection result indicates discordance, the second frame cycle counter does not load the first count value and instead outputs the count value previously counted as the second count value.

Embodiment 1

Configuration of Embodiment 1

Figure 1:
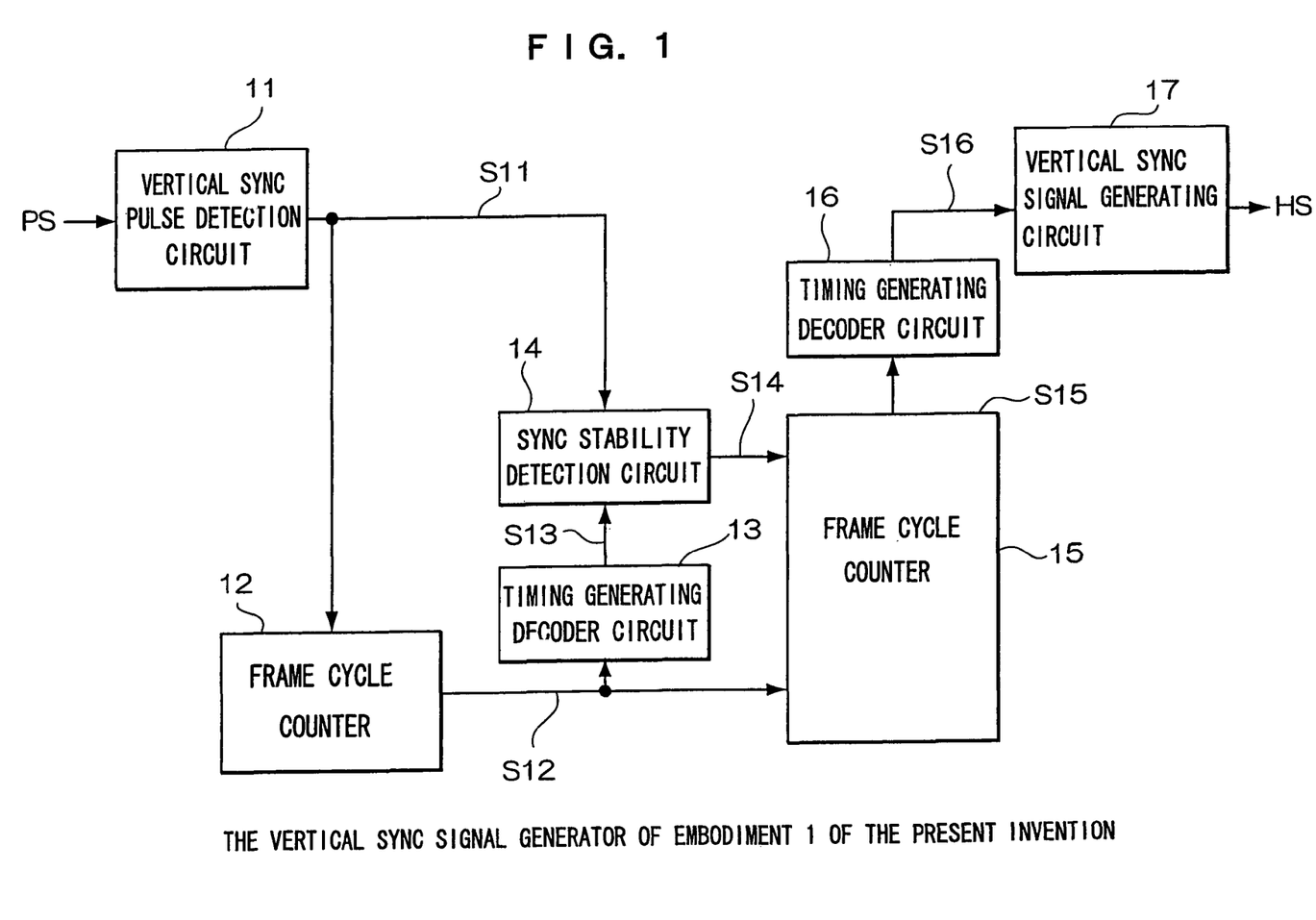
FIG. 1 is a general structural block diagram of a vertical sync signal generator showing Embodiment 1 of the present invention.

FIG. 1 is a general structural block diagram of the vertical sync signal generator showing Embodiment 1 of the present invention.

This vertical sync signal generator has a vertical sync pulse detection circuit 11 that detects a vertical sync pulse HSP from an inputted video signal PS and outputs a detection signal S11. The vertical sync pulse detection circuit 11 consists of a circuit such as an integral circuit, and is connected at this outputting side to a first count circuit for vertical sync signal generation (e.g., an upright first frame cycle counter) 12 and to an accordance/discordance detection circuit (e.g., sync stability detection circuit) 14. The upright first frame cycle counter 12 counts the frame cycles of the vertical sync pulse HSP based on the detection signal S11 and outputs a count value S12, and is connected at this outputting side to a first timing generating decoder circuit 13 and to a second counting circuit for vertical sync signal generation (e.g., an upright second frame cycle counter) 15. The count MAX is, e.g., 262-263.

The timing generating decoder circuit 13 is a circuit that decodes the count value S12 of the frame cycle counter 12 and generates a timing signal S13, and consists of a logic circuit and the likes. At this outputting side, it is connected to a sync stability detection circuit 14. The sync stability detection circuit 14 is a circuit that compares the detection signal S11 and timing signal S13 in order to confirm the continuity of the detection signal S11, which is the detection result of the vertical sync pulse detection circuit 11 (i.e., to confirm that noise is not included in the video signal PS), and then outputs an accordance confirmation detection result S14 indicating whether in accordance. The sync stability detection circuit 14 consists of a circuit such as a comparing circuit and is connected at this outputting side to a second frame cycle counter 15.

The second frame cycle counter 15 loads the count value S12 when the accordance confirmation detection result S14 is in accordance, counts the frame cycles of the vertical sync pulse HSP based on this count value S12, and outputs a count value S15. At this outputting side, a second timing generating decoder circuit 16 is connected. The count MAX is, e.g., 262-263. The timing generating decoder circuit 16 is a circuit that decodes the count value S15 of the frame cycle counter 15 and generates a timing signal S16, and it consists of a logic circuit and the likes. At this outputting side, the timing generating decoder circuit 16 is connected to a vertical sync signal generating circuit 17. The vertical sync signal generating circuit 17 is a circuit that generates a vertical sync signal HS based on the timing signal S16, synchronizes it to a line phase and then outputs the signal. The vertical sync signal generating circuit 17 consists of a flip-flop circuit and the like.

Operation of Embodiment 1

Figure 2:
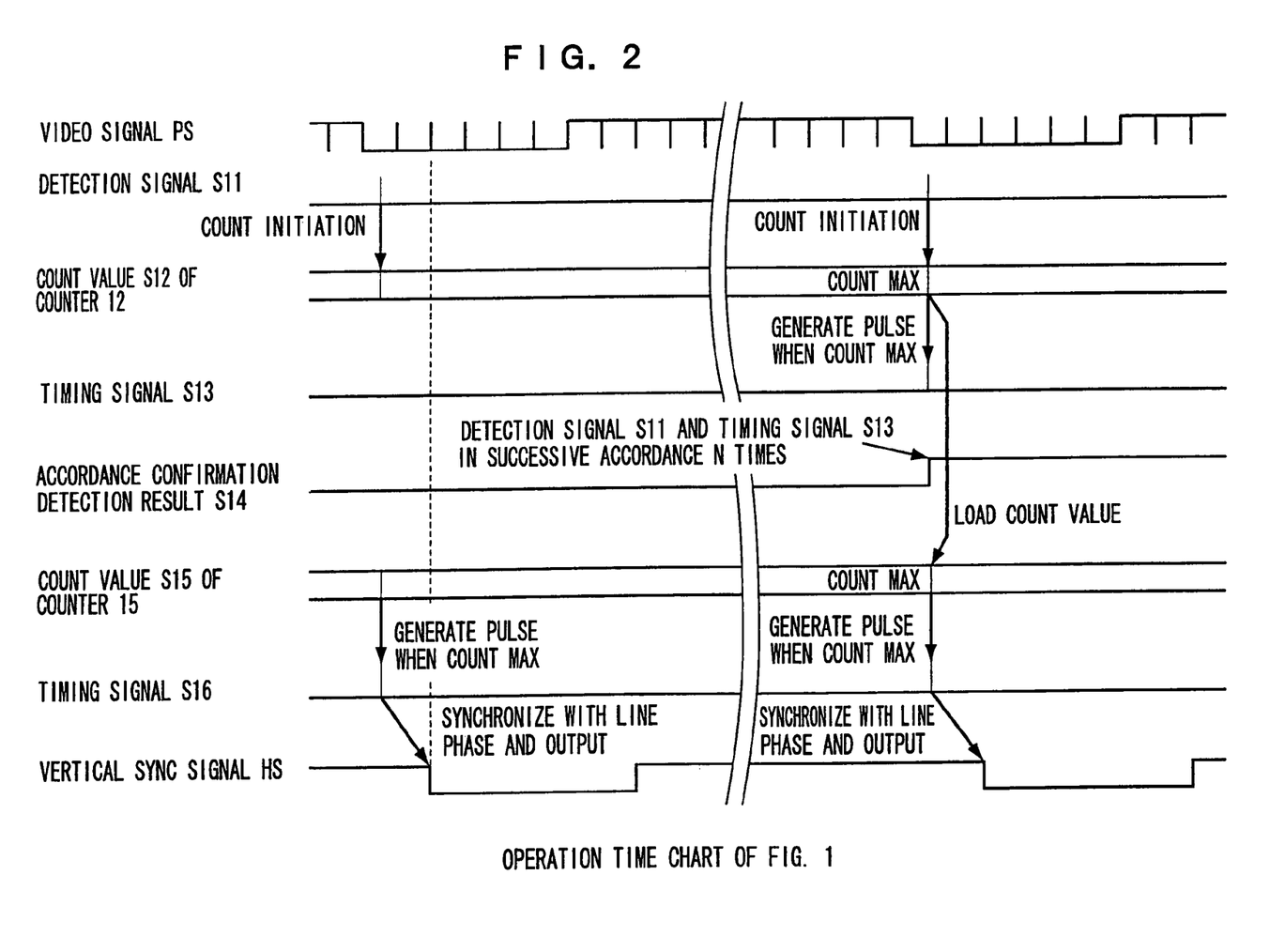
FIG. 2 is a time chart showing the operation of the vertical sync signal generator of FIG. 1.

FIG. 2 is a time chart showing the operation of the vertical sync signal generator of FIG. 1.

When a video signal PS is inputted to the vertical sync pulse detection circuit 11, the vertical sync pulse HSP in the video signal PS is detected by this vertical sync pulse detection circuit 11, and the detection signal S11 is sent to the frame cycle counter 12 and the sync stability detection circuit 14. Due to this detection signal S11, the frame cycle counter 12 initiates counting and the timing at which the next vertical sync pulse HSP should be detected is counted. The count value S12 is outputted to the timing generating decoder circuit 13 and the frame cycle counter 15.

The count value S12 is decoded with the timing generating decoder circuit 13 and when the count value S12 becomes the MAX (e.g., 262-263), a pulse-form timing signal S13 is generated with this timing generating decoder circuit 13 and outputted to the sync stability detection circuit 14. The detection signal S11 and timing signal S13 are compared at the sync stability detection circuit 14, which detects whether the detection signal S11 and timing signal S13 are successively in accordance multiple (N) times. When it has detected that they are in accordance, an accordance confirmation detection result S14 of, e.g., an "H" is outputted to the frame cycle counter 15. In this manner, the normalcy of the detection signal S11 having no errors can be confirmed in the sync stability detection circuit 14 due to this detection of accordance (i.e., the accordance of normalcy of the vertical sync pulse HSP intervals can be confirmed). If the N value in accordance detection increases due to confirmation of accordance N number of successive times, it becomes possible to detect an even more accurate vertical sync pulse HSP.

When normalcy of the detection signal S11 can be confirmed at the sync stability detection circuit 14, the frame cycle counter 15 loads the count value S12 of the frame cycle counter 12 with this accordance confirmation detection result S14. At this time, the counting operations of the frame cycle counter 12 and the frame cycle counter 15 become the same. The count value S15 of the frame cycle counter 15 is decoded at the timing generating decoder circuit 16 and when the count value S15 becomes the MAX (e.g., 262-263), a pulse-form timing signal S16 is generated by this timing generating decoder circuit 16, synchronized to a line phase, and outputted to the vertical sync signal generating circuit 17. At the vertical sync signal generating circuit 17, the vertical sync signal HS is generated using the timing signal S16 and then outputted.

Effect of Embodiment 1

With Embodiment 1, the sync stability detection circuit 14 and frame cycle counter 15 are provided, so even in a case where a vertical sync pulse HSP is mistakenly detected by the vertical sync pulse detection circuit 11, the normalcy at the sync stability detection circuit 14 cannot be confirmed so load is not placed on the frame cycle counter 15. For this reason, an effect can be obtained where a vertical sync signal HS can be generated at the previously detected normal phase, and this is due to the operation of the frame cycle counter 15, the timing generating decoder circuit 16, and the vertical sync signal generating circuit 17.

Embodiment 2

Configuration of Embodiment 2

Figure 3:
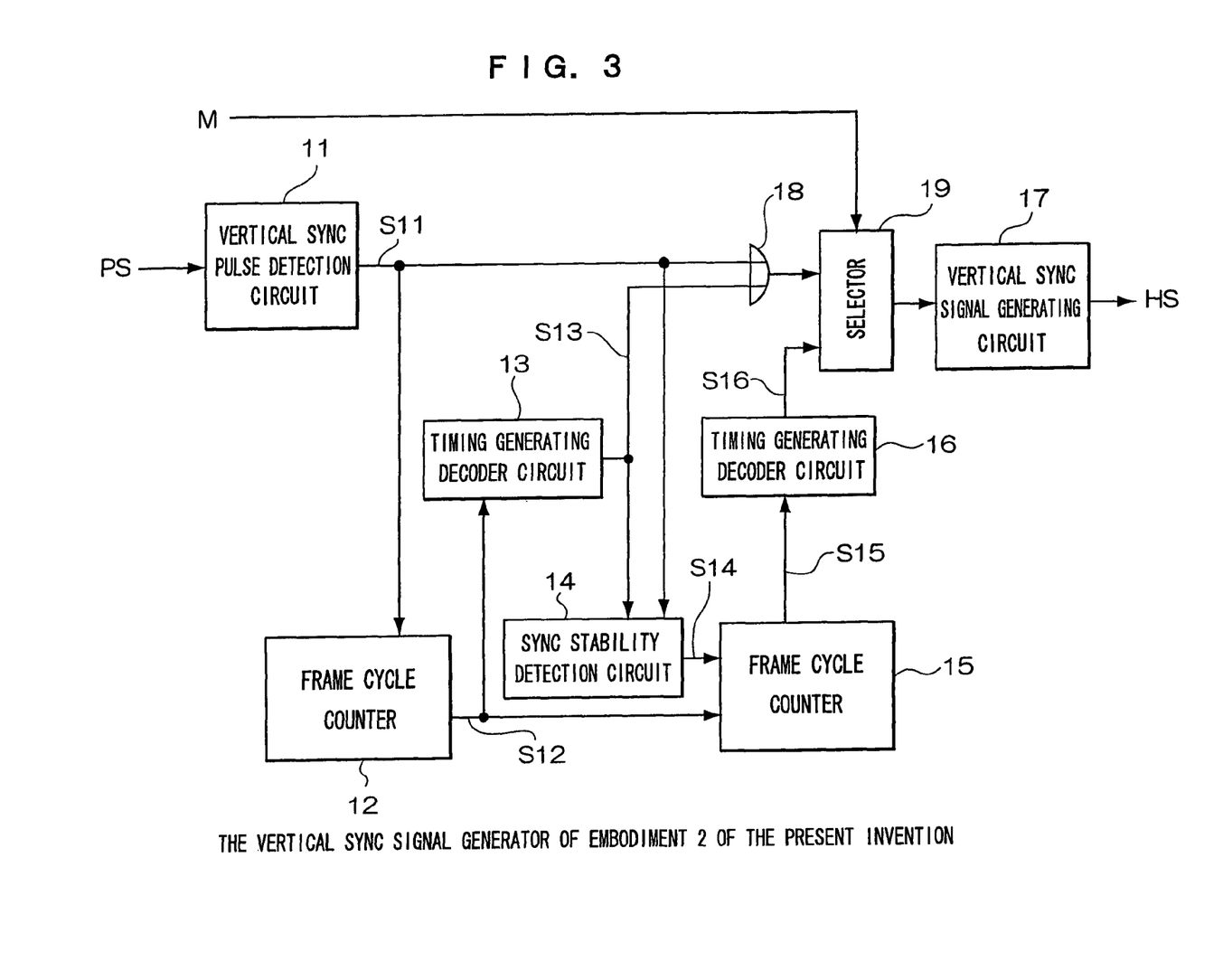
FIG. 3 is a general structural block diagram of a vertical sync signal generator showing Embodiment 2 of the present invention.

FIG. 3 is a general structural block diagram of a vertical sync signal generator showing Embodiment 2 of the present invention. Elements that are the same as in FIG. 1 showing Embodiment 1 have been assigned the same numbers.

With Embodiment 1, an effect is exhibited with regard to the mistaken detection of a vertical sync pulse HSP of a TV weak electric field. When the inputted video signal PS switches, a vertical sync pulse HSP after switching is detected. This is problematic because after normalcy of accordance N successive times has been confirmed at the sync stability detection circuit 14, load is placed on the frame cycle counter 15, and a vertical sync pulse HSP of N times must be detected until the vertical sync signal HS is generated, and this takes time.

Here, in order to do away with this kind of problem, Embodiment 2 is configured to have a gate circuit (e.g., 2-input OR gate) 18 added with a switching circuit (e.g., selector) 19 for selecting one of output from this OR gate 18 or output from the timing generating decoder circuit 16, and the output of this selector 19 is inputted to the vertical sync signal generating circuit 17. These additional circuits are added at the outputting side of the vertical sync pulse detection circuit 11 and the timing generating decoder circuit 13. That is, the present embodiment differs from Embodiment 1 in that the input to the vertical sync signal generating circuit 17 is artificially switched by the selector 19 with a selection signal (e.g., the signal of a TV weak electric field mode M imparted from outside) between the timing signal S13 made by the count value S12 of the vertical sync pulse detection circuit 11 and the frame cycle counter 12 and the timing signal S16 made by the count value S15 of the frame cycle counter 15.

This is configured so that, for example, when the inputted video signal PS is a video signal, there is little noise so the selector 19 is switched to the OR gate 18 side due to the mode M of the TV weak electric field. When the video signal PS is a TV signal, there is a lot of noise so the selector 19 is switched to the timing generating decoder circuit 16 side due to the mode M of the TV weak electric field. Other configurations are the same as in Embodiment 1.

Operation of Embodiment 2

Figure 4:
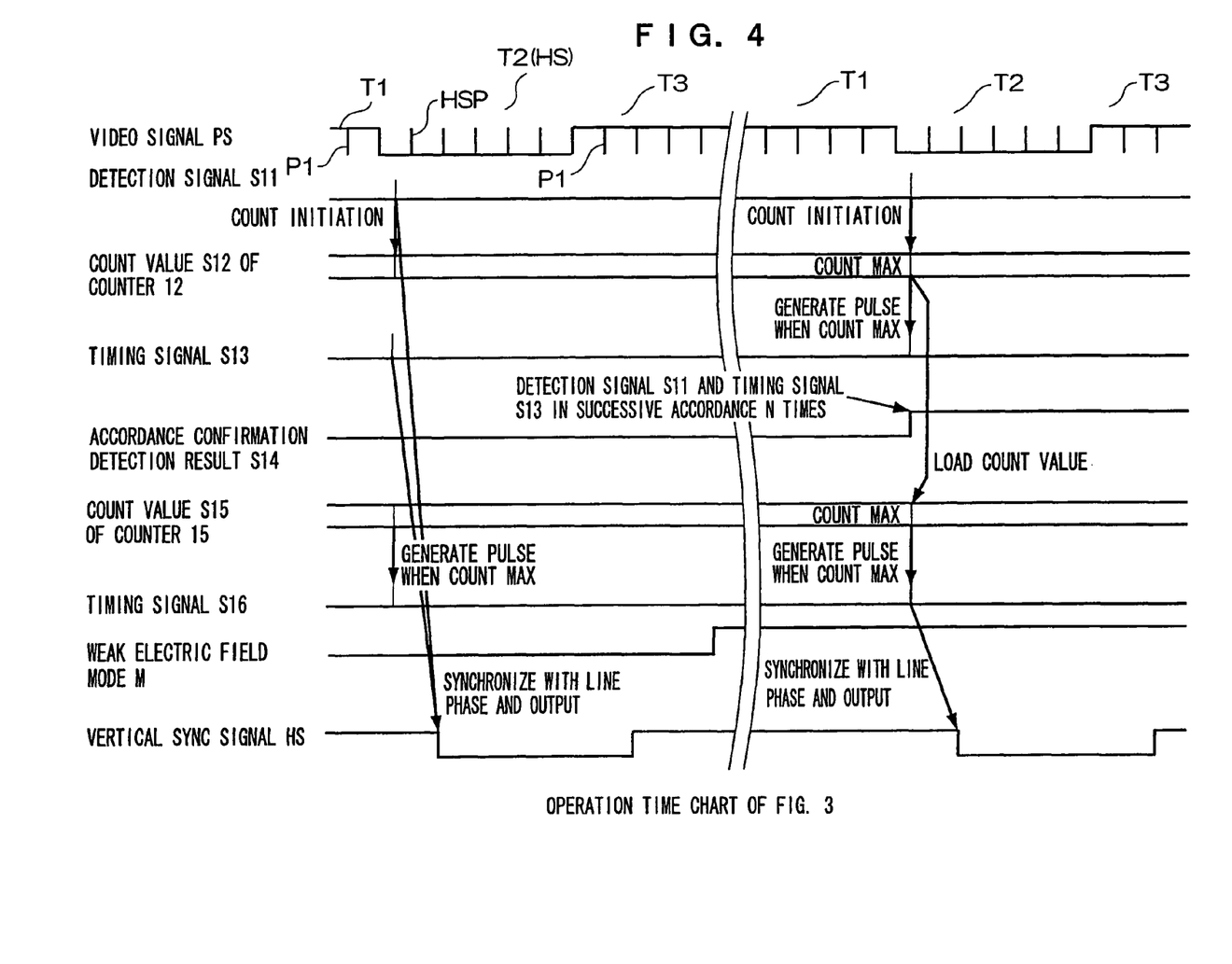
FIG. 4 is a time chart showing the operation of the vertical sync signal generator of FIG. 3.

FIG. 4 is a time chart showing the operation of the vertical sync signal generator of FIG. 3.

When a video signal PS is inputted, the detection signal S11 detected at the vertical sync pulse detection circuit 11 is used and the timing at which the vertical sync pulse HSP should next be detected is counted at the frame cycle counter 12. The timing signal S13 is generated from the count value S12 of the frame cycle counter 12 at the first timing generating decoder circuit 13. The accordance of the timing signal S13 and detection signal S11 is detected at the sync stability detection circuit 14, whereby the normalcy of the detection signal S11 can be confirmed. If the N value of the detection of accordance increases due to confirmation of accordance N number of successive times, it becomes possible to detect even more accurate vertical sync pulse HSP.

When the normalcy of the detection signal S11 can be confirmed at the sync stability detection circuit 14, the count value S12 of the frame cycle counter 12 is loaded to the frame cycle counter 15. At this time, the counting operations of the frame cycle counter 12 and the frame cycle counter 15 become the same. The timing signal S16 is generated at the timing generating decoder circuit 16 from the timing signal S15 of the frame cycle counter 15.

The signals inputted to the vertical sync signal generating circuit 17 are selected with the selector 19 using TV weak electric field mode M that is a signal inputted from outside. When it is a TV weak electric field mode M (e.g., when it is a TV signal with a lot of noise), the timing signal S16 is selected. When it is not a TV weak electric field mode M (when it is a video signal with little noise), the detection signal S11 and timing signal S13 are selected via the OR gate 18. Due to this, a vertical sync signal HS is generated at the vertical sync signal generating circuit 17 using the timing signal S16, or the detection signal S11 and timing signal S13, and then outputted.

Effect of Embodiment 2

With Embodiment 2, the selector 19 selected by the TV weak electric field mode M that is a signal inputted from outside was provided. Accordingly, prior to switching the image, the state of the TV weak electric field mode M that is a signal input from outside from beforehand is switched to a state that is not a TV weak electric field mode M, whereby an effect can be obtained where a vertical sync signal HS synchronized with the input video signal PS can be generated.

Embodiment 3

Configuration of Embodiment 3

Figure 5:
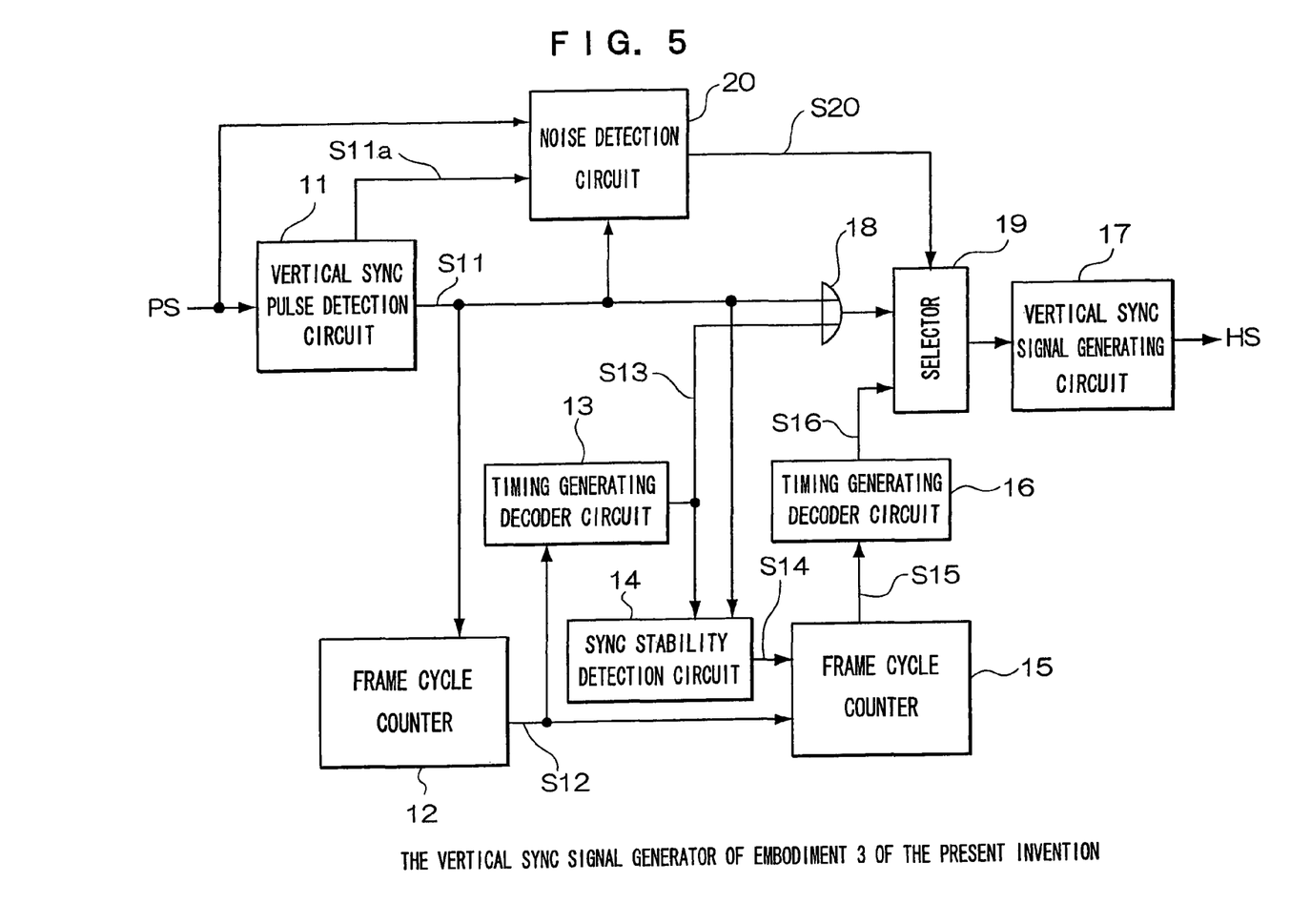
FIG. 5 is a general structural block diagram of a vertical sync signal generator showing Embodiment 3 of the present invention.

FIG. 5 is a general structural block diagram of a vertical sync signal generator showing Embodiment 3 of the present invention. The elements that are the same as those in FIG. 3 showing Embodiment 2 have been given the same numbers.

With Embodiment 2, when switching the inputted video signal PS, it is necessary to switch, in advance, the TV weak electric field mode M that is a signal input from outside. This means that a user must operate the device and is thus inconvenient.

In order to do away with this inconvenience, a noise removing circuit (e.g., noise detection circuit) 20 is added to present Embodiment 3. Then, the presence or absence of noise is detected with the noise detection circuit 20 based on the inputted video signal PS, the detection signal S11 outputted from the vertical sync pulse detection circuit 11 that consists of an integral circuit and the like, and a detection period signal S11 a generated using this integral circuit, and then a noise detection signal S20 is generated. The configuration is such that when it has been detected with this noise detection circuit 20 that there is noise in the inputted video signal PS, the selector 19 is switched to the side of the timing generating decoder circuit 16. When no noise has been detected, it switches to the side of the OR gate 18. The noise detection circuit 20 is configured to have a device such as a level circuit and the likes that detects when there is noise when, for example, the level of the video signal PS exceeds a detection threshold (threshold value) TH. Other configurations are the same as in Embodiment 2.

Operation of Embodiment 3

Figure 6:
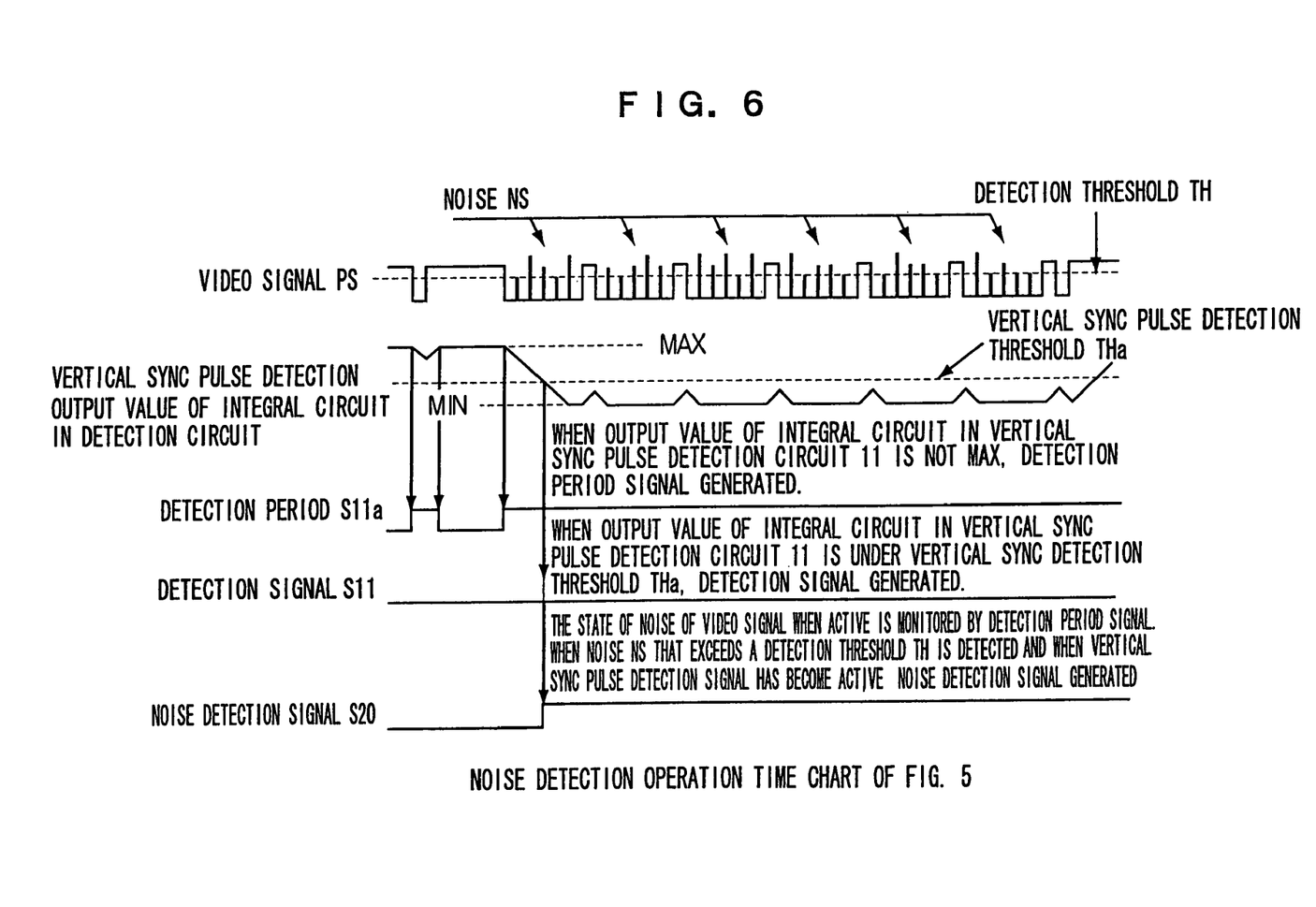
FIG. 6 is a time chart showing the noise detection operation in the noise detection circuit 20 of FIG. 5.

FIG. 6 is a time chart showing the noise detection operation in the noise detection circuit 20 of FIG. 5.

When video signal PS is inputted to the vertical sync pulse detection circuit 11 and the noise detection circuit 20, the detection signal S11 and detection period signal S11a from this vertical sync pulse detection circuit 11 are outputted and imparted to the noise detection circuit 20. At the noise detection circuit 20, it is detected whether there is a noise NS in the vertical sync pulse interval T2 of the inputted video signal PS. When there is noise NS, the noise detection signal S20 is generated. An example of how detection of this noise NS can be performed is as follows.

In FIG. 6, fundamentally, a state where the video signal level is low continues through the vertical sync pulse interval T2, however, the low-level state is not maintained due to the noise NS, so a state where the level is high exists. The vertical sync pulse detection circuit 11 has, for example, an integral circuit (hereafter referred to by the code "11a") for detecting a vertical sync signal HS. The integral circuit 11a performs subtraction processing when the video signal PS goes below the detection threshold TH, and addition processing when it goes over. A greatest value (MAX) and a minimum value (MIN) are provided, and addition is not performed for the MAX or over and subtraction is not performed for the MIN or less. When the output value of the integral circuit 11a is in a state where it is not the MAX, the detection period signal S11a is generated. Also, a vertical sync detection threshold THa is provided in the output value of the integral circuit 11a and when the output value of the integral circuit 11a falls below the threshold THa, the detection signal S11 is generated.

During the period where the detection period signal S11a is being generated, the noise detection circuit 20 determines whether there is noise NS that is over the detection threshold TH, and further, when the detection signal S11 is generated showing that a vertical sync pulse HSP was detected, the noise detection signal S20 is generated if there was noise NS.

Hereafter, the overall operation of the vertical sync signal generator of FIG. 5 including the noise detection circuit 20 will be explained.

Figure 7:
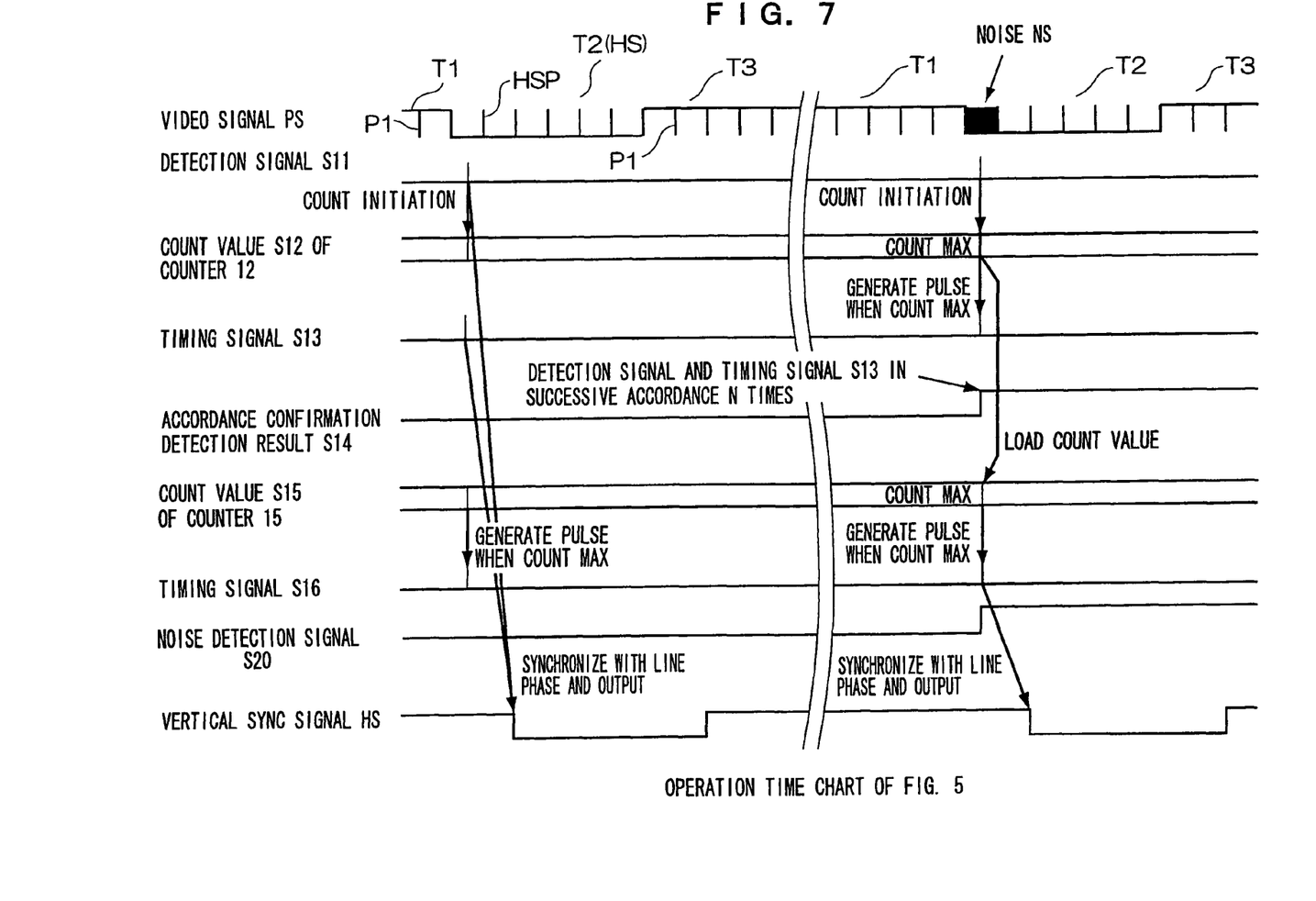
FIG. 7 is a time chart showing the entire operation of the vertical sync signal generator of FIG. 5.

FIG. 7 is a time chart showing the entire operation of the vertical sync signal generator of FIG. 5.

When the video signal PS is inputted, the detection signal S11 detected at the vertical sync pulse detection circuit 11 is used and the timing for when the vertical sync pulse HSP should next be detected is counted. The timing signal S13 is generated at the timing generating decoder circuit 13 from the count value S12 of the frame cycle counter 12. By detecting accordance between the timing signal S13 and detection signal S11 at the sync stability detection circuit 14, the normalcy of the detection signal S11 can be confirmed. Accordance detection confirms the accordance N number of successive times, and the larger the value of N becomes, the more possible it is to detect a more-accurate vertical sync pulse HSP.

When the normalcy of the detection signal S11 was confirmed at the sync stability detection circuit 14, the count value S12 of the frame cycle counter 12 is loaded to the frame cycle counter 15. At this time, the counting operations of the frame cycle counter 12 and frame cycle counter 15 become the same. The timing signal S16 is generated at the timing generating decoder circuit 16 from the count value S15 of the frame cycle counter 15. The signal inputted to the vertical sync signal generating circuit 17 is selected by the selector 19 using the noise detection signal S20. At the time of detection of noise NS, the timing signal S16 is selected and when noise NS is not detected, the detection signal S11 and the timing signal S13 are selected via the OR gate 18. A vertical sync signal HS is generated and outputted at the vertical sync signal generating circuit 17 using the timing signal S16, or the detection signal S11 and timing signal S13.

Effect of Embodiment 3

With the present Embodiment 3, the noise detection circuit 20 was provided so depending on the state of the video, an effect can be obtained where generation of a vertical sync signal HS synchronized when normal with the inputted video signal PS, and generation of a vertical sync signal HS using the synchronization when normalcy was confirmed, can be automatically switched with the selector 19.

It should be noted that the present invention is not limited to the above-described Embodiments 1-3 and various alternatives and forms of use are possible.

For example, with Embodiment 2, an example applied to a device was explained where it is unknown whether the inputted video signal PS is the standard signal (i.e., a signal not including noise NS) or a TV weak electric field signal. Nonetheless, if the device is one that can manage what type of signal the inputted video signal PS is, artificial operation is not necessary. The device can automatically switch the TV weak electric field mode M that is the signal inputted from outside. Further, the circuit structures of FIGS. 1, 3 and 5 can be changed to other circuit structures, or those circuits can be configured to execute programs using a central processing unit (CPU). Furthermore, the time charts in FIGS. 2, 4, 6 and 7 can be changed to operations besides those shown in the drawings.

Embodiments of the present invention are described above, but the present invention is not limited to the embodiments, as will be clear to those skilled in the art.

Namely, the first embodiment of the present invention is a vertical sync signal generator comprising: a vertical sync pulse detection circuit that detects a vertical sync pulse from an inputted video signal and outputs a detection signal; a first count circuit that counts a frame cycle of the vertical sync pulse from the detection signal and outputs a first count result; a first timing generating decoder circuit that decodes the first count result and generates a first timing signal for when the vertical sync pulse should be detected next; an accordance/discordance detection circuit that detects whether the detection signal and the first timing signal are in accordance and outputs a detection result of accordance/discordance; a second count circuit that, when the detection result is of accordance, loads the first count value and counts a frame cycle of the vertical sync pulse from the first count value with the loaded first count value acting as the initial value and outputs a second count value, and when the detection result is one of discordance, does not load the first count value and outputs the previously counted count value as the second count value; a second timing generating decoder circuit that decodes the second count result and generates a second timing signal for generation of a vertical sync signal; and a vertical sync signal generating circuit that uses the second timing signal and generates a vertical sync signal.

With the invention according to the above-described first embodiment, the accordance/discordance detection circuit and the second count circuit are provided. Accordingly, even when the vertical sync pulse is mistakenly detected with the vertical sync pulse detection circuit, load is not placed on the second count circuit because normalcy of the vertical sync pulse interval in the accordance/discordance detection circuit cannot be confirmed. For this reason, with the operation of the second count circuit, the timing generating decoder circuit, and the vertical sync signal generating circuit, the vertical sync signal can be generated at the previously detected normal phase.

Furthermore, in the above-described first embodiment, the detection signal and the gate circuit that seeks the logical sum of the first timing signal, and the second timing signal and the outputted signal of the gate circuit, are inputted and the output is switched with a selection signal. At the time of a TV weak electric field mode, the second timing signal is outputted and imparted to the vertical sync signal generating circuit to make it generate the vertical sync signal. When it is not a TV weak electric field mode, the output signal of the gate circuit is outputted and imparted to the vertical sync signal generating circuit, and this can have a switching circuit that makes it generate the vertical sync signal.

Due to the above-described configuration, the switching circuit that can switch the output with a selection signal is provided so, for example, prior to switching the video, the state of the TV weak electric field mode is switched in advance to a state that is not a TV weak electric field mode, whereby the vertical sync signal synchronized with the inputted video signal can be quickly generated.

Further, in the above-described first embodiment, the outputted signals of: the gate circuit that seeks the logical sum of the detection signal and the first timing signal; of the noise detection signal that detects whether there is noise in the vertical sync pulse period in the inputted video signal and outputs a noise detection result; and of the second timing signal and the outputted signal of the gate circuit, are all inputted. The output is switched depending on the noise detection result. A switching circuit can be provided so that when the noise detection result is that there is noise, the second timing signal is outputted and imparted to the vertical sync signal generating circuit and the vertical sync signal is generated. When the noise detection result is that there is no noise, the output signal of the gate circuit is outputted and imparted to the vertical sync signal generating circuit and the vertical sync signal is generated.

Due to the above-described configuration, the noise detection circuit is provided so, for example, depending on the state of the video, the generation of the vertical sync signal synchronized with the inputted video signal when normal and the generation of the vertical sync signal using the cycle at the time normalcy has been confirmed can be automatically switched with the switching circuit.

What is claimed is:

1. A vertical sync signal generator comprising:
   a vertical sync pulse detection circuit that detects a vertical sync pulse from an inputted video signal and outputs a detection signal;
   a first count circuit that counts a frame cycle of the vertical sync pulse from the detection signal and outputs a first count result;
   a first timing generating decoder circuit that decodes the first count result and generates a first timing signal for when the vertical sync pulse should be detected next;
   an accordance/discordance detection circuit that detects whether the detection signal and the first timing signal are in accordance and outputs a detection result of accordance/discordance;
   a second count circuit that, when the detection result is of accordance, loads the first count value and counts a frame cycle of the vertical sync pulse from the first count value with the loaded first count value acting as the initial value and outputs a second count value, and when the detection result is one of discordance, does not load the first count value and outputs the previously counted count value as the second count value;
   a second timing generating decoder circuit that decodes the second count result and generates a second timing signal for generation of a vertical sync signal; and
   a vertical sync signal generating circuit that uses the second timing signal and generates the vertical sync signal.

2. The vertical sync signal generator of claim 1, further comprising:
   a gate circuit that seeks the logical sum of the detection signal and the first timing signal;
   a switching circuit that inputs the second timing signal and the outputted signal of the gate circuit and which can switch the output with a selection signal, and, when in a TV weak electric field mode, outputs the second timing signal, imparts it to the vertical sync signal generating circuit and makes it generate the vertical sync signal and when not in a TV weak electric field mode, outputs the output signal of the gate circuit, imparts it to the vertical sync signal generating circuit and makes it generate the vertical sync signal.

3. The vertical sync signal generator of claim 1, further comprising:
   a gate circuit that seeks the logical sum of the detection signal and the first timing signal;
   a noise detection circuit that detects whether there is noise in the vertical sync pulse period in the inputted video signal and outputs a noise detection result; and
   a switching circuit that inputs the second timing signal and the outputted signal of the gate circuit and which can switch the output with the noise detection result, and, when the noise detection result is that there is noise, outputs the second timing signal, imparts it to the vertical sync signal generating circuit and makes it generate the vertical sync signal and when the noise detection result is that there is no noise, outputs the output signal of the gate circuit, imparts it to the vertical sync signal generating circuit and makes it generate the vertical sync signal.

4. The vertical sync signal generator of claim 3, wherein the noise detection circuit uses an integral circuit for the vertical sync pulse detection circuit and detects whether there is noise in the vertical sync pulse period from the generated detection period signal and the detection signal outputted from the vertical sync pulse detection circuit.

* * * * *